: US 8,890,948 B2
: Nov. 18, 2014

(12) United States Patent
Hwang et al.

(54) IMAGE DISPLAY DEVICE AND METHOD FOR DRIVING THE SAME

(75) Inventors: Kwangjo Hwang, Anyang-si (KR); Donghoon Lee, Goyang-si (KR); Seok Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 98 days.

(21) Appl. No.: 13/338,026

(22) Filed: Dec. 27, 2011

(65) Prior Publication Data

US 2012/0268453 A1 Oct. 25, 2012

(30) Foreign Application Priority Data

Apr. 20, 2011 (KR) ........................ 10-2011-0036669

(51) Int. Cl.
*H05K 1/16* (2006.01)
*H04N 7/18* (2006.01)
*G09G 3/00* (2006.01)
*H04N 13/04* (2006.01)
*G09G 3/36* (2006.01)

(52) U.S. Cl.
CPC ........... *G09G 3/003* (2013.01); *H04N 13/0434* (2013.01); *H04N 13/0452* (2013.01); *G09G 3/3648* (2013.01); *G09G 3/3607* (2013.01); *G09G 3/3659* (2013.01); *G09G 3/3677* (2013.01); *G09G 2300/0443* (2013.01); *G09G 2310/061* (2013.01)
USPC ...................................... 348/79; 348/E7.085

(58) Field of Classification Search
CPC ....................................................... G06T 15/00
USPC ............................. 348/51; 345/419; 359/465
See application file for complete search history.

(56) References Cited

U.S. PATENT DOCUMENTS

| 4,877,307 | A | * | 10/1989 | Kalmanash | .................... 359/465 |
| 8,547,418 | B2 | * | 10/2013 | Hong | ................................ 348/43 |
| 8,624,963 | B2 | * | 1/2014 | Lim | ................................ 348/51 |
| 8,654,159 | B2 | * | 2/2014 | Hwang et al. | ................. 345/694 |
| 8,743,188 | B2 | * | 6/2014 | Kim | .................................. 348/58 |
| 8,797,346 | B2 | * | 8/2014 | Park et al. | ..................... 345/590 |
| 8,810,569 | B2 | * | 8/2014 | Hwang | .......................... 345/419 |
| 2007/0242068 | A1 | * | 10/2007 | Han et al. | ...................... 345/427 |
| 2010/0289884 | A1 | * | 11/2010 | Kang | ................................ 348/58 |
| 2012/0050261 | A1 | * | 3/2012 | Feng et al. | ..................... 345/419 |
| 2012/0126720 | A1 | * | 5/2012 | Kim et al. | ...................... 315/307 |

FOREIGN PATENT DOCUMENTS

CN 101888564 A 11/2010

* cited by examiner

*Primary Examiner* — Richard Torrente
*Assistant Examiner* — Frank Huang
(74) *Attorney, Agent, or Firm* — Birch, Stewart, Kolasch & Birch, LLP

(57) ABSTRACT

An image display device and a method for driving the same are discussed. The image display device includes a display panel, which includes a subpixel disposed at a crossing between a pair of gate lines and a data line to selectively display a 2D image and a 3D image, a panel driver including a gate driver for driving the pair of gate lines and a data driver for driving the data line, a controller for differently controlling the panel driver in response to a mode selection signal, and a patterned retarder for dividing light from the display panel into first polarized light and second polarized light.

8 Claims, 16 Drawing Sheets

2D MODE

3D MODE

IMAGE DISPLAY DEVICE AND METHOD FOR DRIVING THE SAME

This application claims the benefit of Korean Patent Application No. 10-2011-0036669 filed on Apr. 20, 2011, which is incorporated herein by reference for all purposes as if fully set forth herein.

BACKGROUND OF THE INVENTION

1. Field of the Invention

Embodiments of the invention relate to an image display device and a method for driving the same capable of selectively implementing a two-dimensional plane image (hereinafter referred to as '2D image') and a three-dimensional stereoscopic image (hereinafter referred to as '3D image').

2. Discussion of the Related Art

Recently, an image display device may selectively implement a 2D image and a 3D image due to the development of various contents and circuit technology. The image display device implements the 3D image using a stereoscopic technique or an autostereoscopic technique.

The stereoscopic technique, which uses a parallax image between left and right eyes of a user with a high stereoscopic effect, includes a glasses type method and a non-glasses type method, both of which have been put to practical use. In the non-glasses type method, an optical plate such as a parallax barrier for separating an optical axis of the parallax image between the left and right eyes is generally installed in front of or behind a display screen. In the glasses type method, left and right eye images each having a different polarization direction are displayed on a display panel, and a stereoscopic image is implemented using polarized glasses or liquid crystal shutter glasses.

A liquid crystal shutter glasses type image display alternately displays a left eye image and a right eye image on a display element every one frame and opens and closes a left eyeglass and a right eyeglass of liquid crystal shutter glasses in synchronization with a display timing, thereby implementing the 3D image. The liquid crystal shutter glasses open only the left eyeglass during odd-numbered frame periods, in which the left eye image is displayed, and open only the right eyeglass during even-numbered frame periods, in which the right eye image is displayed, thereby making binocular disparity in a time division method. In the liquid crystal shutter glasses type image display, because the liquid crystal shutter glasses are turned on in a short period of time, a luminance of the 3D image is low. Further, a 3D crosstalk is extremely generated because of the synchronization between the display element and the liquid crystal shutter glasses and the ON/OFF conversion response characteristic.

As shown in FIG. 1, a polarized glasses type image display includes a patterned retarder 2 attached to a display panel 1. The polarized glasses type image display alternately displays left eye image data L and right eye image data R on the display panel 1 every one horizontal line and converts polarization characteristics of light incident on polarized glasses 3 using the patterned retarder 2. Through such an operation of the polarized glasses type image display, a left eye image and a right eye image may be spatially divided, thereby implementing a 3D image.

In the polarized glasses type image display, because the left eye image and the right eye image are adjacently displayed on the adjacent horizontal lines of the display panel 1, a range of a vertical viewing angle, in which a crosstalk is not generated, is very narrow. The crosstalk is generated when a doubled image of the left eye image and the right eye image is displayed at a location of the vertical viewing angle. To prevent the crosstalk in the polarized glasses type image display, as shown in FIG. 2, a method for forming black stripes BS in an area of a patterned retarder 2 to thereby widen a vertical viewing angle of the 3D image had been proposed in Japanese Laid Open Publication No. 2002-185983. However, the black stripes BS of the patterned retarder 2 used to widen the vertical viewing angle cause side effects resulting in a large reduction in a luminance of a 2D image.

SUMMARY OF THE INVENTION

Embodiments of the invention provide an image display device and a method for driving the same capable of widening a vertical viewing angle of a 3D image without a reduction in a luminance of a 2D image.

Embodiments of the invention also provide an image display device and a method for driving the same capable of improving the reliability of a gate driver.

In one aspect, there is an image display device comprising a display panel configured to selectively display a 2D image and a 3D image, the display panel including a subpixel disposed at a crossing between a pair of gate lines and a data line, a panel driver including a gate driver for driving the pair of gate lines and a data driver for driving the data line, a controller configured to differently control the panel driver in response to a mode selection signal, and a patterned retarder configured to divide light from the display panel into first polarized light and second polarized light, wherein in a 2D mode, an auxiliary display unit of the subpixel is charged to a common voltage in response to an auxiliary scan pulse supplied to an auxiliary gate line of the pair of gate lines, and then the auxiliary display unit and a main display unit of the subpixel are charged to a 2D data voltage for the 2D image by a main scan pulse supplied to a main gate line of the pair of gate lines, wherein in a 3D mode, the main display unit and the auxiliary display unit are charged to a 3D data voltage for the 3D image in response to the main scan pulse, and then the auxiliary display unit is charged to the common voltage by the auxiliary scan pulse.

In another aspect, there is a method for driving an image display device including a display panel, which includes a subpixel disposed at a crossing between a pair of gate lines and a data line to selectively display a 2D image and a 3D image, a panel driver for driving the pair of gate lines and the data line, and a patterned retarder for dividing light from the display panel into first polarized light and second polarized light, the method comprising receiving a mode selection signal, deciding a 2D mode and a 3D mode in response to the mode selection signal, charging an auxiliary display unit of the subpixel to a common voltage in response to an auxiliary scan pulse supplied to an auxiliary gate line of the pair of gate lines and then charging the auxiliary display unit and a main display unit of the subpixel to a 2D data voltage for the 2D image by a main scan pulse supplied to a main gate line of the pair of gate lines in the 2D mode, and charging the main display unit and the auxiliary display unit to a 3D data voltage for the 3D image in response to the main scan pulse and then charging the auxiliary display unit to the common voltage by the auxiliary scan pulse in the 3D mode.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

Exemplary embodiments of the invention will be described with reference to FIGS. 3 to 15B.

Figure 1:
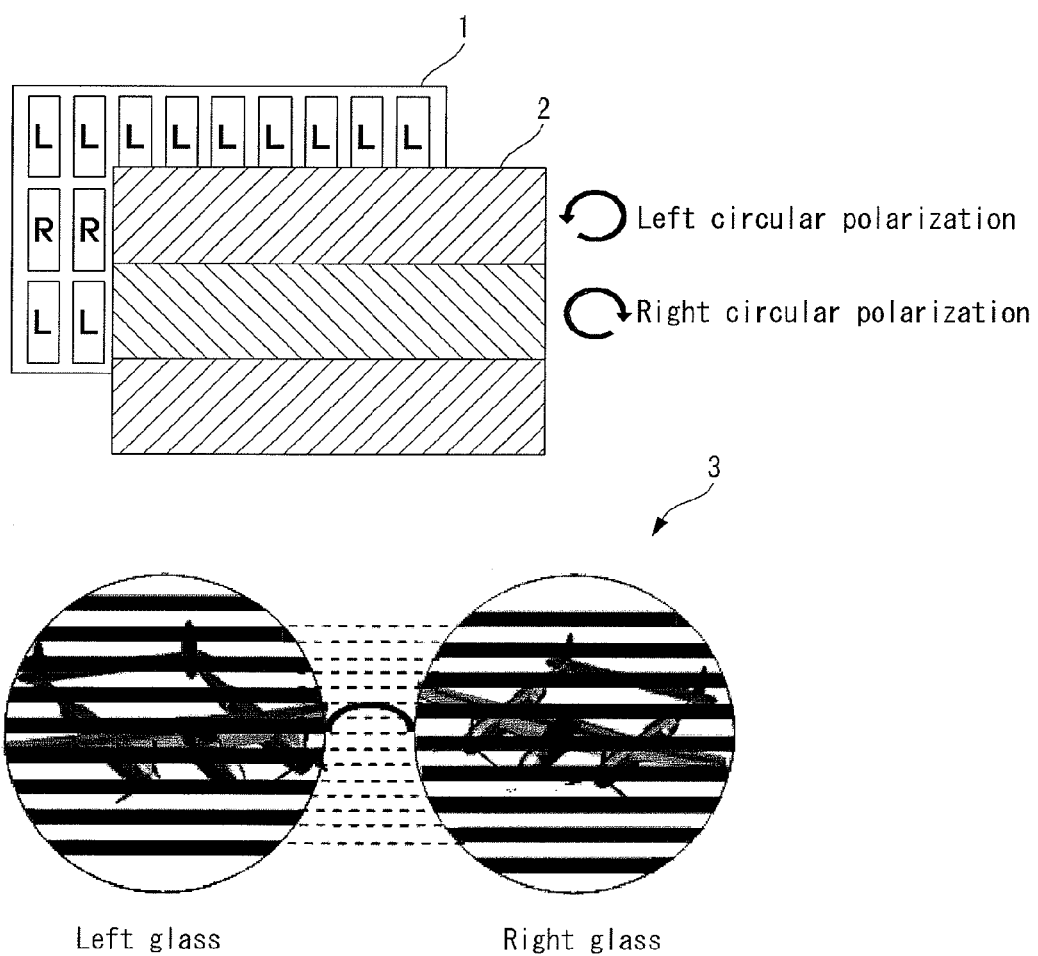
FIG. 1 illustrates a related art polarized glasses type image display.
Figure 2:
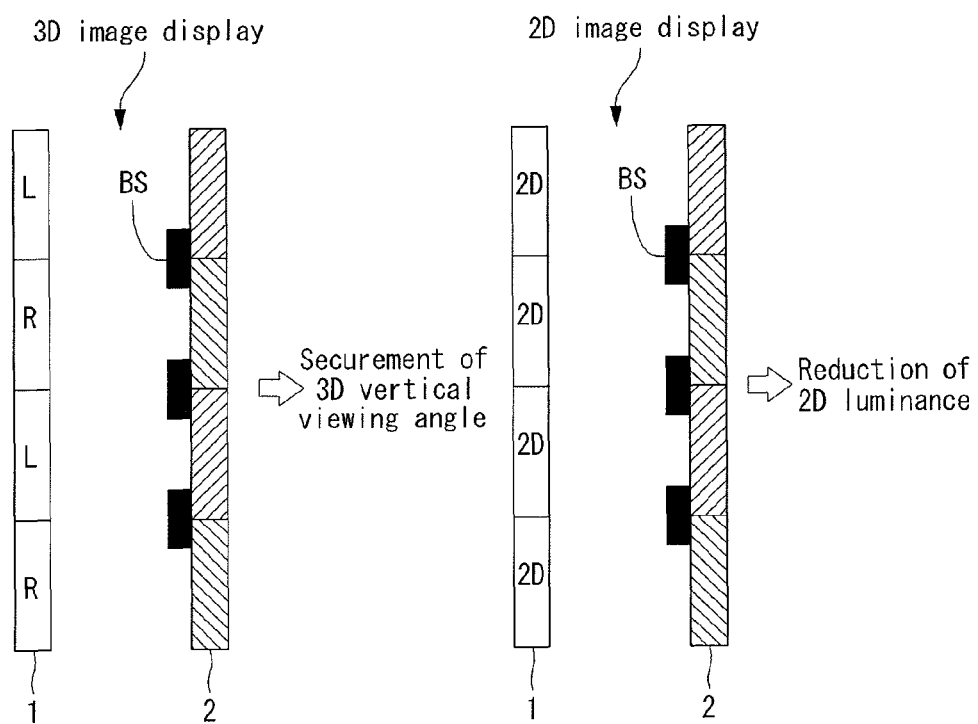
FIG. 2 illustrates that a luminance of a 2D image is reduced by black stripes used to widen a vertical viewing angle in a related art polarized glasses type image display.
Figure 3:
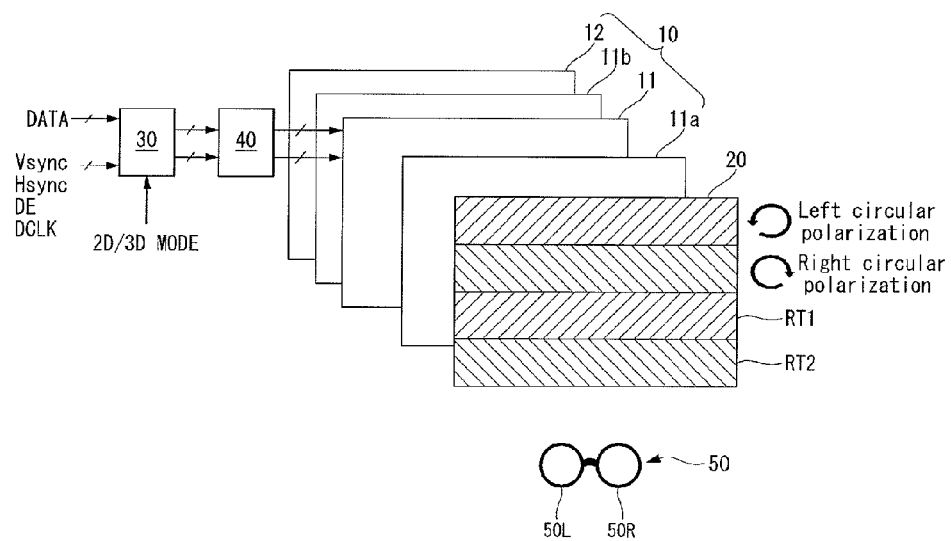
FIGS. 3 and 4 illustrate a polarized glasses type image display according to an exemplary embodiment of the invention.
Figure 4:
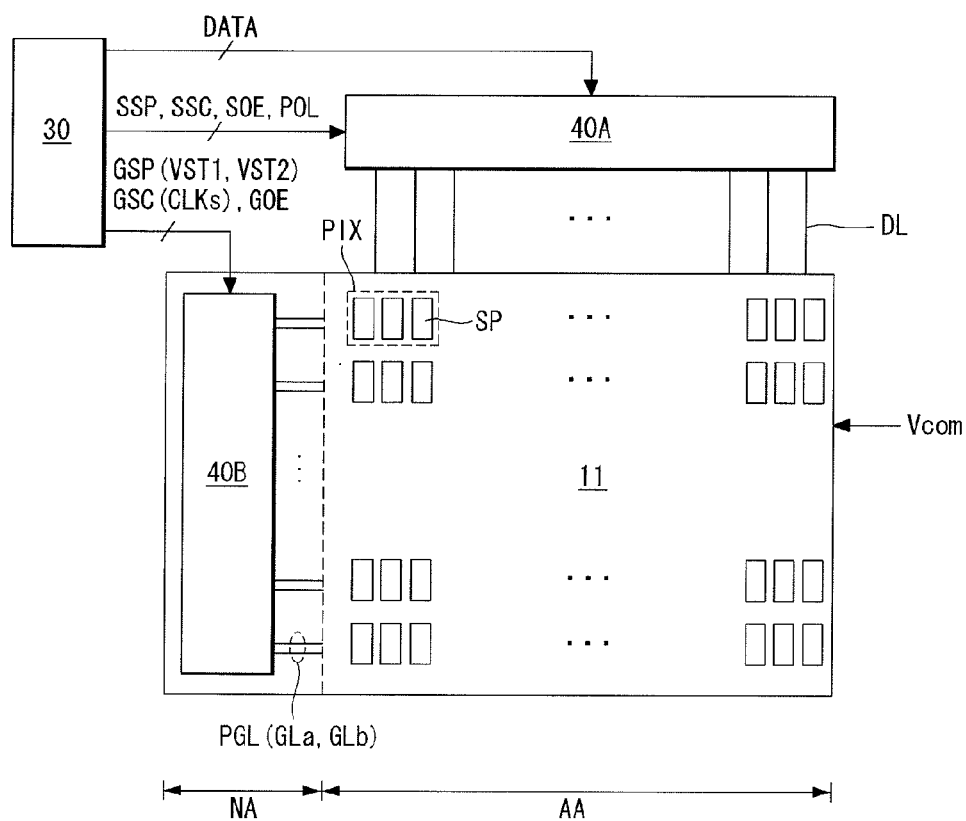

FIGS. 3 and 4 illustrate a polarized glasses type image display according to an exemplary embodiment of the invention.

As shown in FIGS. 3 and 4, the image display device according to the embodiment of the invention includes a display element 10, a patterned retarder 20, a controller 30, a panel driver 40, and polarized glasses 50.

The display element 10 may be implemented as a flat panel display such as a liquid crystal display (LCD), a field emission display (FED), a plasma display panel (PDP) display, an electroluminescence device (EL) including an inorganic electroluminescence element and an organic light emitting diode (OLED), and an electrophoretic display (EPD). In the following description, the image display device according to the embodiment of the invention is described using the liquid crystal display as the display element 10.

The display element 10 includes a display panel 11, an upper polarizing film 11a, and a lower polarizing film 11b.

The display panel 11 includes an upper glass substrate, a lower glass substrate, and a liquid crystal layer between the upper and lower glass substrates. A plurality of data lines DL and a plurality of pairs of gate lines PGL crossing the data lines DL are disposed on the lower glass substrate of the display panel 11. Each of the pairs of gate lines PGL includes a main gate line GLa and an auxiliary gate line GLb. A plurality of pixels PIX each including a liquid crystal cell are disposed in an effective display area AA of the display panel 11 in a matrix form based on a crossing structure between the data lines DL and the pairs of gate lines PGL, thereby constituting a pixel array. Black matrixes, color filters, and common electrodes are formed on the upper glass substrate of the display panel 11. Each of the pixels PIX includes a red subpixel, a green subpixel, and a blue subpixel.

The upper polarizing film 11a is attached to the upper glass substrate of the display panel 11, and the lower polarizing film 11b is attached to the lower glass substrate of the display panel 11. Alignment layers for setting a pre-tilt angle of liquid crystals are respectively formed on the upper and lower glass substrates of the display panel 11. In a vertical electric field driving manner such as a twisted nematic (TN) mode and a vertical alignment (VA) mode, the common electrodes, to which a common voltage Vcom is supplied, are formed on the upper glass substrate. In a horizontal electric field driving manner such as an in-plane switching (IPS) mode and a fringe field switching (FFS) mode, the common electrodes are formed on the lower glass substrate along with pixel electrodes. A column spacer may be formed between the upper and lower glass substrates to keep cell gaps of the liquid crystal cells of the display panel 11 constant.

An amount of light passing through the liquid crystal layer is determined by a voltage difference between the pixel electrode and the common electrode. As the voltage difference between the pixel electrode and the common electrode increases, the amount of light passing through the liquid crystal layer increases and thus is represented by a white gray level. On the contrary, as the voltage difference between the pixel electrode and the common electrode decreases, the amount of light passing through the liquid crystal layer decreases and thus is represented by a black gray level.

The display element 10 according to the embodiment of the invention may be implemented as any type liquid crystal display including a backlit liquid crystal display, a transflective liquid crystal display, and a reflective liquid crystal display. A backlight unit 12 is necessary in the backlit liquid crystal display and the transflective liquid crystal display. The backlight unit 12 may be implemented as a direct type backlight unit or an edge type backlight unit.

The patterned retarder 20 is attached to the upper polarizing film 11a of the display panel 11. The patterned retarder 20 includes a plurality of first retarders RT1, which are respectively formed on odd-numbered lines of the patterned retarder 20, and a plurality of second retarders RT2, which are respectively formed on even-numbered lines of the patterned retarder 20. Light absorption axes of the first retarders RT1 are perpendicular to light absorption axes of the second retarders RT2. The first retarders RT1 transmit first polarized light (for example, left circularly polarized light) of light incident from the pixel array. The second retarders RT2 transmit second polarized light (for example, right circularly polarized light) of light incident from the pixel array. Thus, the first retarder RT1 may be implemented as a polarizing filter transmitting the left circularly polarized light, and the second retarder RT2 may be implemented as a polarizing filter transmitting the right circularly polarized light.

The controller 30 controls an operation of the panel driver 40 in a 2D mode and a 3D mode in response to a mode selection signal SEL. The controller 30 receives the mode selection signal SEL through a user interface such as a touch screen, an on-screen display (OSD), a keyboard, a mouse, and a remote controller. The controller 30 may switch between an operation of the 2D mode and an operation of the 3D mode in response to the mode selection signal SEL. The controller 30 detects a 2D/3D identification code encoded to data of an input image, for example, a 2D/3D identification code capable of being coded to an electronic program guide (EPG) or an electronic service guide (ESG) of a digital broadcasting standard, thereby distinguishing between the 2D mode and the 3D mode.

In the 3D mode, the controller 30 divides 3D image data received from a video source into RGB data of a left eye image and RGB data of a right eye image. Then, the controller 30 alternately supplies the RGB data of the left eye image corresponding to one horizontal line and the RGB data of the right eye image corresponding to one horizontal line to the panel driver 40. In the 2D mode, the controller 30 sequentially supplies RGB data of a 2D image received from the video source to the panel driver 40.

The controller 30 generates control signals for controlling operation timing of the panel driver 40 using timing signals such as a vertical sync signal Vsync, a horizontal sync signal Hsync, a data enable DE, and a dot clock DCLK.

A data control signal for controlling operation timing of a data driver 40A of the panel driver 40 includes a source start pulse SSP, a source sampling clock SSC, a source output enable SOE, a polarity control signal POL, and the like. The source start pulse SSP indicates a supply start time point of data corresponding to one horizontal line in one horizontal period during which the data corresponding to the one horizontal line is displayed. The source sampling clock SSC controls a latch operation of data based on a rising or falling edge thereof. The source output enable SOE controls an output of the data driver 40A. The polarity control signal POL controls a polarity of a data voltage to be supplied to the liquid crystal cells of the display panel 11.

A gate control signal for controlling operation timing of a gate driver 40B of the panel driver 40 includes a gate start pulse GSP, a gate shift clock GSC, a gate output enable GOE, and the like. The gate start pulse GSP indicates a start horizontal line of a scan operation in one vertical period during which one screen is displayed. The gate shift clock GSC is input to a shift register inside the gate driver 40B and sequentially shifts the gate start pulse GSP. The gate output enable GOE controls an output of the gate driver 40B. The gate start pulse GSP includes a first gate start signal VST1 and a second gate start signal VST2. In the 2D mode, the first gate start signal VST1 may be generated later than the second gate start signal VST2 by a predetermined time period. On the other hand, in the 3D mode, the first gate start signal VST1 may be generated earlier than the second gate start signal VST2 by a predetermined time period.

The controller 30 multiplies the frequency of the timing signals Vsync, Hsync, DE, and DCLK synchronized with an input frame frequency by N to obtain a frame frequency of (f×N) Hz, where N is a positive integer equal to or greater than 2 and f is the input frame frequency. Hence, the controller 30 may control the operation of the panel driver 40 based on the frame frequency of (f×N) Hz. The input frame frequency is 50 Hz in a phase alternate line (PAL) scheme and 60 Hz in a national television standards committee (NTSC) scheme.

The panel driver 40 includes the data driver 40A for driving the data lines DL of the display panel 11 and the gate driver 40B for driving the pairs of gate lines PGL of the display panel 11.

The data driver 40A includes a plurality of source driver integrated circuits (ICs). Each of the source driver ICs includes a shift register, a latch, a digital-to-analog converter (DAC), an output buffer, etc. The data driver 40A latches the RGB data of the 2D or 3D image in response to the data control signals SSP, SSC, and SOE. The data driver 40A converts the RGB data of the 2D/3D image into analog positive and negative gamma compensation voltages in response to the polarity control signal POL and inverts a polarity of the data voltage. The data driver 40A outputs the data voltage to the data lines DL, so that the data voltage is synchronized with a main scan pulse output from the gate driver 40B. The source driver ICs of the data driver 40A may be bonded to the lower glass substrate of the display panel 11 through a tape automated bonding (TAB) process.

The gate driver 40B includes a shift register array, etc. The shift register array of the gate driver 40B may be formed in a non-display area NA outside the effective display area AA of the display panel 11, in which the pixel array is formed, through a gate-in-panel (GIP) manner. A plurality of gate shift registers included in the shift register array may be formed along with the pixel array through the GIP manner in a thin film transistor (TFT) process of the pixel array.

The gate driver 40B drives the pairs of gate lines PGL in response to the gate control signals GSP, GSC, and GOE. The gate driver 40B sequentially supplies the main scan pulse of a turn-on level to the main gate lines GLa of the pairs of gate lines PGL. The gate driver 40B sequentially supplies an auxiliary scan pulse of a turn-on level to the auxiliary gate lines GLb of the pairs of gate lines PGL.

The polarized glasses 50 include a left eyeglass 50L having a left eye polarizing filter (or a first polarizing filter) and a right eyeglass 50R having a right eye polarizing filter (or a second polarizing filter). The left eye polarizing filter has the same light absorption axis as the first retarder RT1 of the patterned retarder 20, and the right eye polarizing filter has the same light absorption axis as the second retarder RT2 of the patterned retarder 20. For example, a left circular polarizing filter may be selected as the left eye polarizing filter of the polarized glasses 50, and a right circular polarizing filter may be selected as the right eye polarizing filter of the polarized glasses 50. A user may view the 3D image, which is displayed on the display element 10 in a spatial division manner, through the polarized glasses 50.

Figure 5:
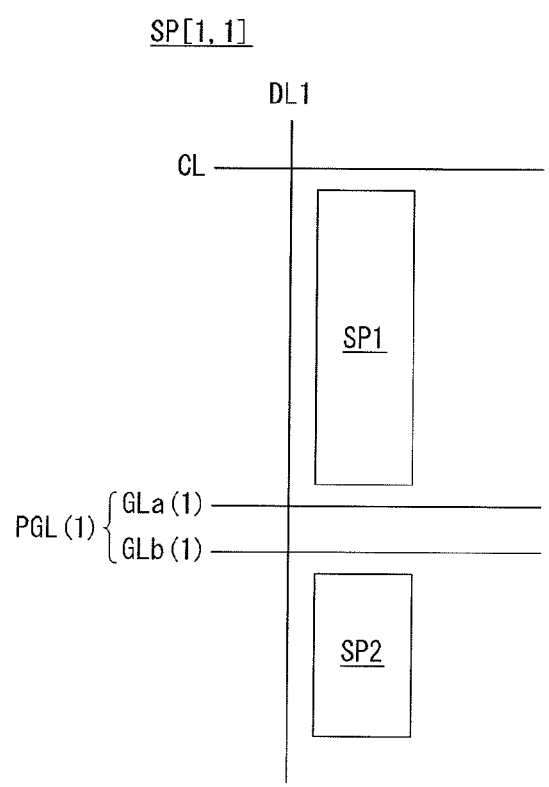
FIG. 5 schematically illustrates a subpixel arranged in a pixel array.

FIG. 5 schematically illustrates a subpixel SP disposed at a crossing (1, 1) between a first data line DL1 and a first pair of gate lines PGL(1) in the pixel array. The first pair of gate lines PGL(1) include a first main gate line GLa(1) and a first auxiliary gate line GLb(1).

As shown in FIG. 5, the subpixel SP may be one of a red subpixel, a green subpixel, and a blue subpixel.

The subpixel SP includes a main subpixel SP1 and an auxiliary subpixel SP2 with the first pair of gate lines PGL(1) interposed between them. The main subpixel SP1 is electrically connected to the first data line DL1 when the first main gate line GLa(1) is activated. The auxiliary subpixel SP2 is electrically connected to the first data line DL1 when the first main gate line GLa(1) is activated, and is electrically connected to a common line CL when the first auxiliary gate line GLb(1) is activated.

In FIG. 5, the auxiliary subpixel SP2 selectively displays a black image depending on a driving mode and thus widens a vertical viewing angle of the 3D image without a reduction in a luminance of the 2D image.

Figure 6:
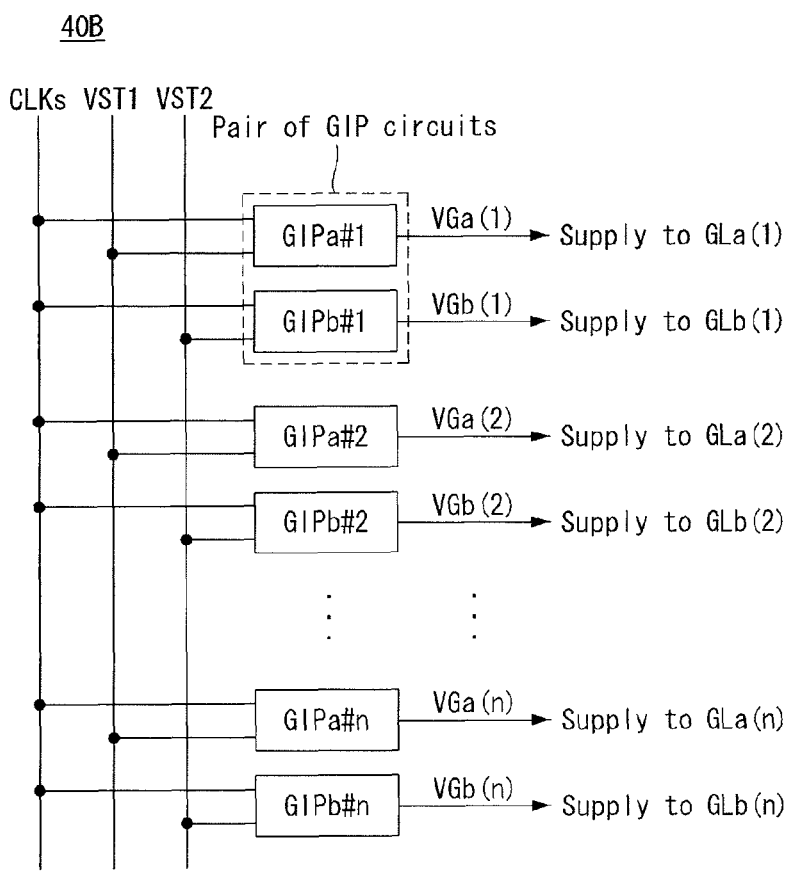
FIG. 6 illustrates a gate driver shown in FIG. 4.

FIG. 6 illustrates in detail the gate driver 40B shown in FIG. 4.

As shown in FIG. 6, the gate driver 40B includes a plurality of pairs of GIP circuits for respectively driving the pairs of gate lines PGL. Each of the pairs of GIP circuits includes a main GIP circuit GIPa and an auxiliary GIP circuit GIPb.

In each of the 2D and 3D modes, the main GIP circuits GIPa#1 to GIPa#n sequentially generate main scan pulses VGa(1) to VGa(n) of a turn-on level in response to the first gate start signal VST1 and gate shift clocks CLKs and supply the main scan pulses VGa(1) to VGa(n) of the turn-on level to the main gate lines GLa(1) to GLa(n).

In each of the 2D and 3D modes, the auxiliary GIP circuits GIPb#1 to GIPb#n sequentially generate auxiliary scan pulses VGb(1) to VGb(n) of a turn-on level in response to the second gate start signal VST2 and the gate shift clocks CLKs and supply the auxiliary scan pulses VGb(1) to VGb(n) of the turn-on level to the auxiliary gate lines GLb(1) to GLb(n).

Figure 7:
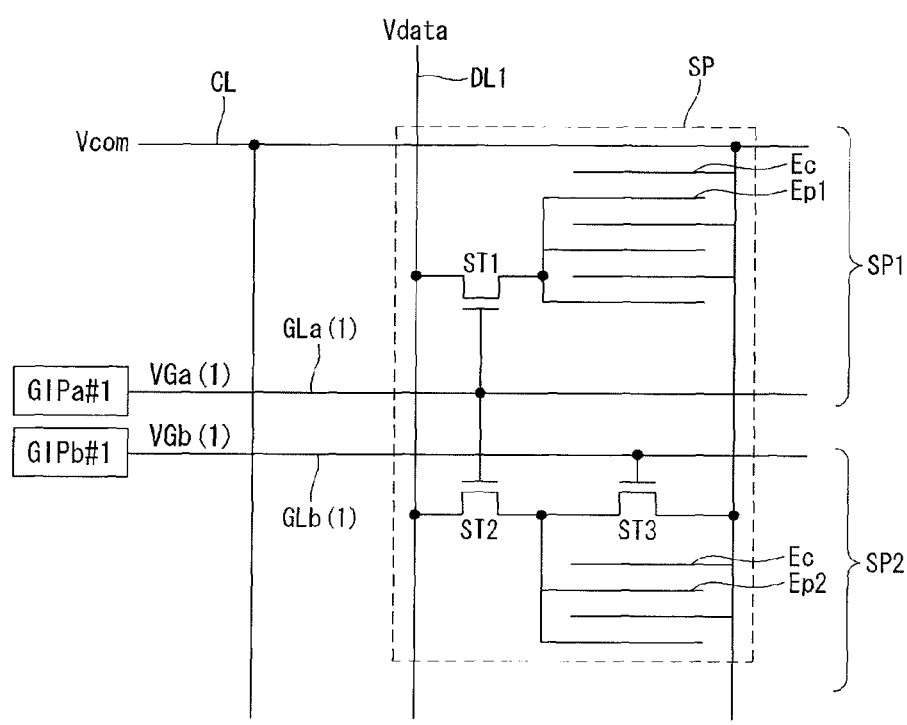
FIG. 7 illustrates a connection configuration of a subpixel shown in FIG. 5.
Figure 8A:
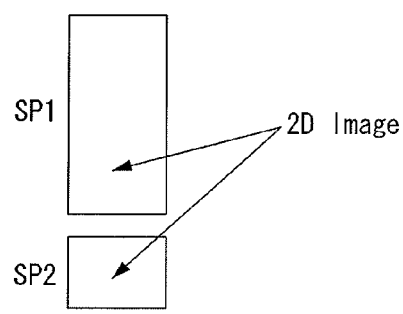
FIGS. 8A and 8B illustrate a display state of a subpixel in a 2D mode and a 3D mode, respectively.
Figure 8B:
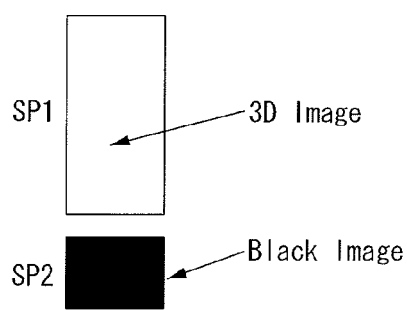
Figure 9:
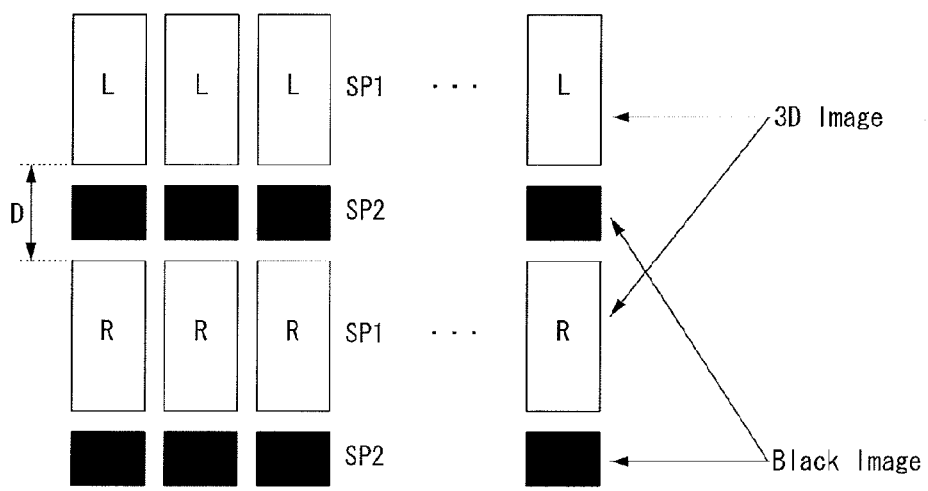
FIG. 9 illustrates a principle to widen a vertical viewing angle in a 3D mode.

FIG. 7 illustrates in detail a connection configuration of the subpixel SP shown in FIG. 5. FIGS. 8A and 8B illustrate a display state of the subpixel SP in the 2D mode and the 3D mode, respectively. FIG. 9 illustrates a principle to widen a vertical viewing angle in the 3D mode.

As shown in FIG. 7, the main subpixel SP1 of the subpixel SP includes a first pixel electrode Ep1 and a common electrode Ec opposite to the first pixel electrode Ep1. The first pixel electrode Ep1 is connected to the data line DL1 through a first TFT ST1. The first TFT ST1 is turned on in response to the main scan pulse VGa(1) and thus applies a data voltage Vdata on the data line DL1 to the first pixel electrode Ep1. A gate electrode of the first TFT ST1 is connected to the main gate line GLa(1), a source electrode of the first TFT ST1 is connected to the data line DL1, and a drain electrode of the first TFT ST1 is connected to the first pixel electrode Ep1. The common electrode Ec is connected to the common line CL charged to the common voltage Vcom.

Further, the auxiliary subpixel SP2 of the subpixel SP includes a second pixel electrode Ep2 and a common electrode Ec opposite to the second pixel electrode Ep2. The second pixel electrode Ep2 is connected to the data line DL1 through a second TFT ST2. The second TFT ST2 is turned on in response to the main scan pulse VGa(1) and thus applies the data voltage Vdata on the data line DL1 to the second pixel electrode Ep2. A gate electrode of the second TFT ST2 is connected to the main gate line GLa(1), a source electrode of the second TFT ST2 is connected to the data line DL1, and a drain electrode of the second TFT ST2 is connected to the second pixel electrode Ep2.

A third TFT ST3 is connected between the second pixel electrode Ep2 and the common electrode Ec of the auxiliary subpixel SP2. The third TFT ST3 is turned on in response to the auxiliary scan pulse VGb(1) and thus applies the common voltage Vcom on the common electrode Ec to the second pixel electrode Ep2. A gate electrode of the third TFT ST3 is connected to the auxiliary gate line GLb(1), a source electrode of the third TFT ST3 is connected to the common electrode Ec, and a drain electrode of the third TFT ST3 is connected to the second pixel electrode Ep2.

As shown in FIG. 8A, in the 2D mode, the main subpixel SP1 and the auxiliary subpixel SP2 of the subpixel SP having the above-described connection configuration are charged to the same 2D data voltage and display the 2D image. The auxiliary subpixel SP2 displays the same 2D image as the main subpixel SP1 and thus increases a display luminance of the 2D image.

As shown in FIG. 8B, in the 3D mode, the main subpixel SP1 of the subpixel SP is charged to the 3D data voltage and displays the 3D image. Further, the auxiliary subpixel SP2 of the subpixel SP is charged to the common voltage and display a black image. As shown in FIG. 9, when a left eye image L and a right eye image R are alternately displayed every one line in the pixel array, the black image displayed on the auxiliary subpixel SP2 increases a display distance D between the left eye image L and the right eye image R, which are adjacent to each other in a vertical direction. Hence, the 3D vertical viewing angle, at which a crosstalk is not generated, may be widely secured through the black images displayed on the auxiliary subpixels SP2 without a separate black stripe pattern.

Figure 11:
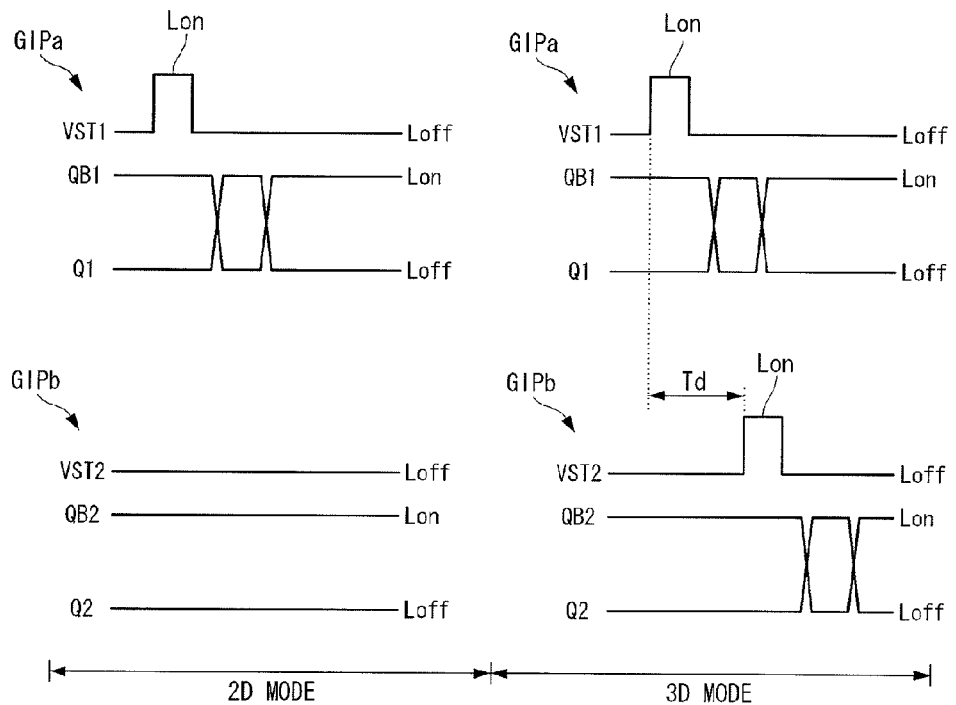
FIGS. 11 to 12B illustrate a method for driving a pair of GIP circuits of FIG. 10 so as to obtain display images shown in FIGS. 8A and 8B.
Figure 12A:
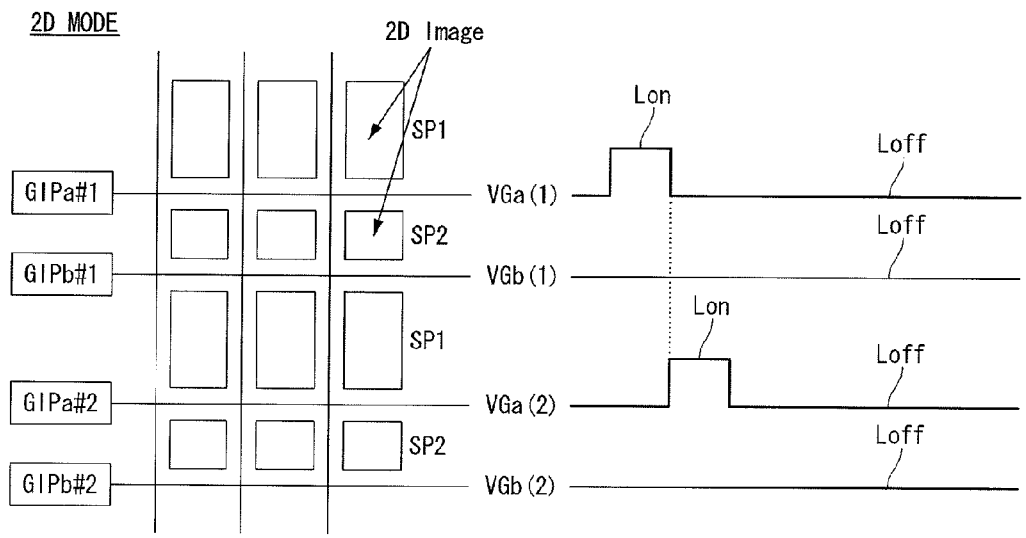
Figure 12B:
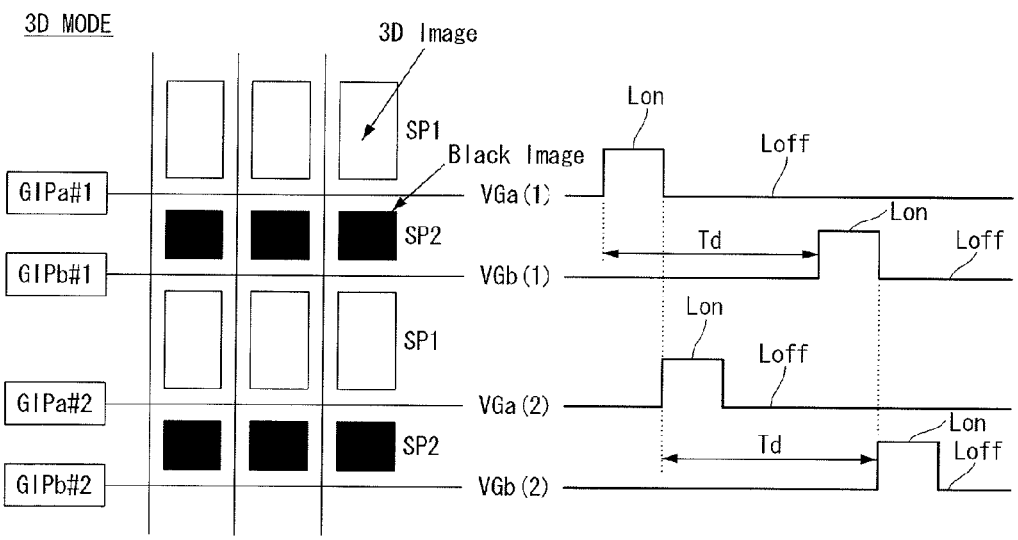
Figure 14:
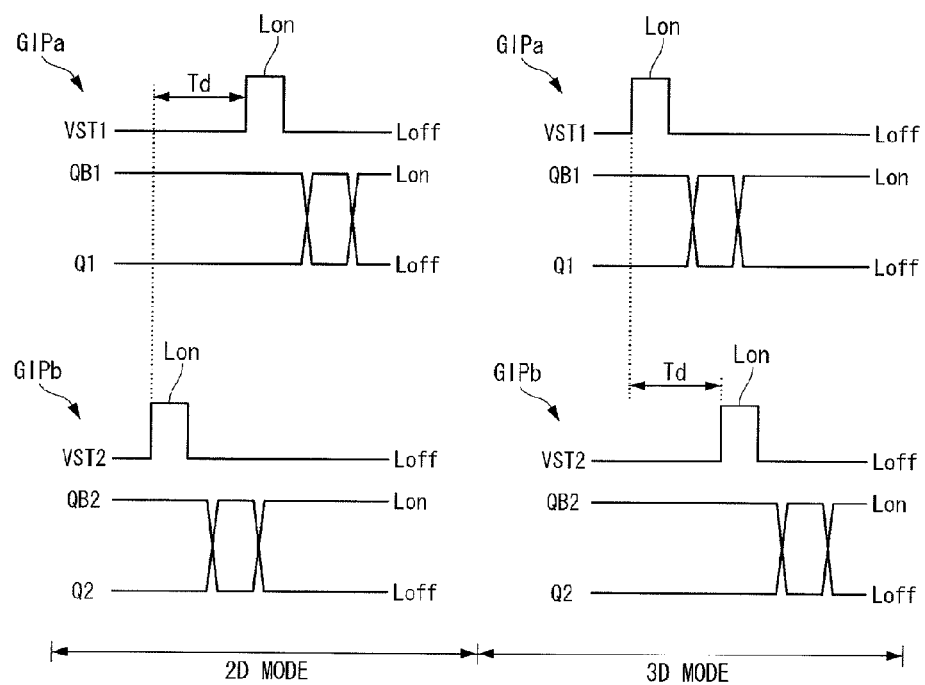
FIGS. 14 to 15B illustrate another method for driving a pair of GIP circuits of FIG. 10 so as to obtain display images shown in FIGS. 8A and 8B.
Figure 15A:
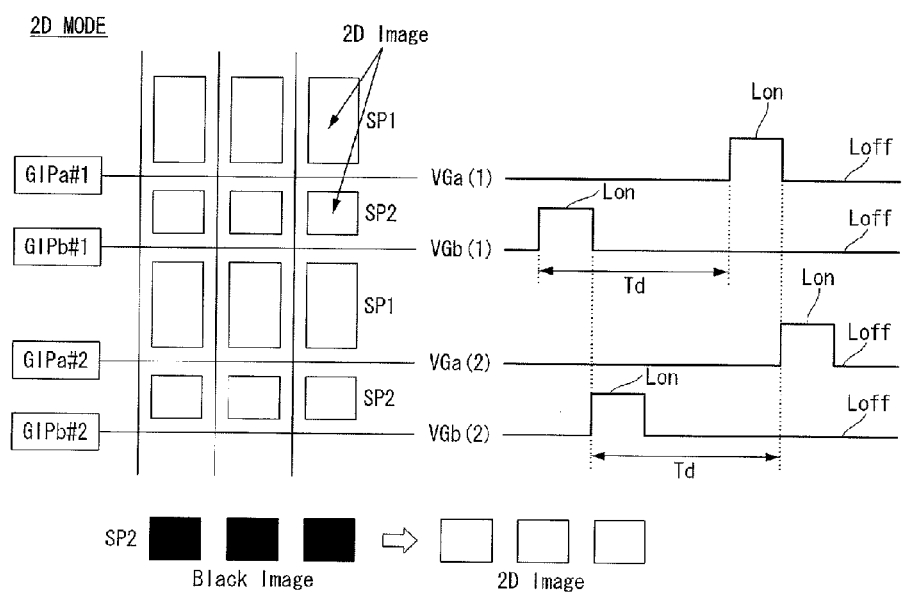
Figure 15B:
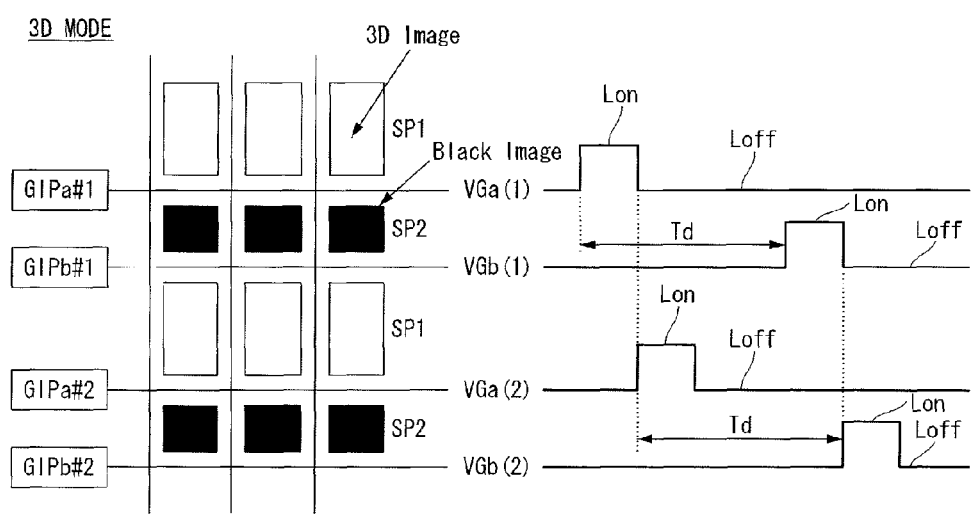

The pairs of GIP circuits may be driven in a method illustrated in FIGS. 11 to 12B or in a method illustrated in FIGS. 14 to 15B, so as to obtain the display images shown in FIGS. 8A and 8B based on the connection configuration of the subpixel SP shown in FIG. 7.

Figure 10:
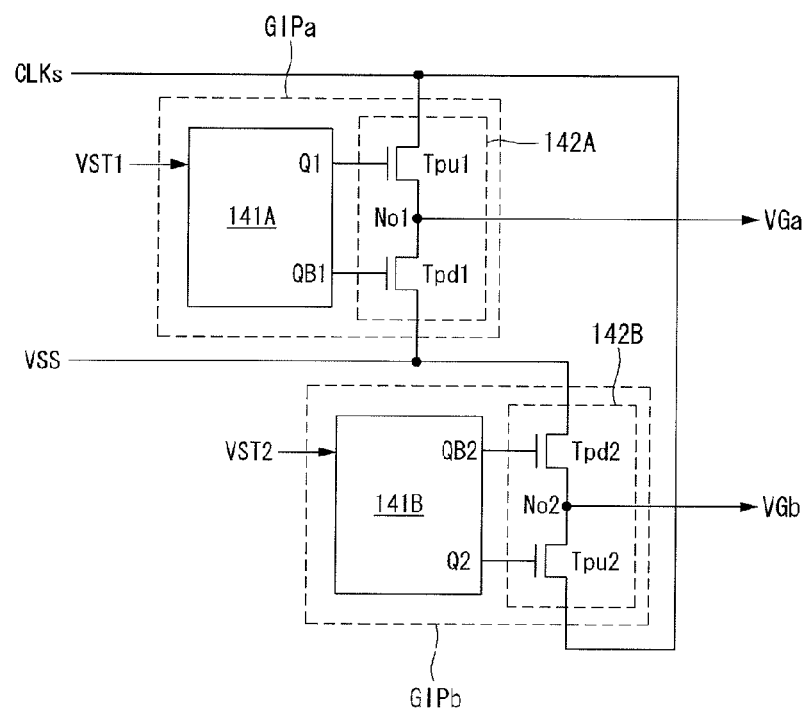
FIG. 10 illustrates a pair of GIP circuits shown in FIG. 6.

FIG. 10 illustrates in detail the pair of GIP circuits shown in FIG. 6.

As shown in FIG. 10, the pair of GIP circuits include the main GIP circuit GIPa and the auxiliary GIP circuit GIPb.

The main GIP circuit GIPa includes a main logic unit 141A and a main output unit 142A having a main pull-up transistor Tpu1 and a main pull-down transistor Tpd1. The main logic unit 141A controls charge and discharge operations of each of a Q1 node and a QB1 node in response to the first gate start signal VST1. The main pull-up transistor Tpu1 of the main output unit 142A outputs the main scan pulse VGa of the turn-on level when the Q1 node is charged to the voltage of an activation level. The main pull-down transistor Tpd1 of the main output unit 142A outputs the main scan pulse VGa of a turn-off level when the QB1 node is charged to the voltage of the activation level.

The Q1 node and the QB1 node are reversely charged and discharged. For example, when the Q1 node is charged to the voltage of the activation level, the QB1 node is discharged to the voltage of a non-activation level. On the contrary, when the Q1 node is discharged to the voltage of the non-activation level, the QB1 node is charged to the voltage of the activation level. When the Q1 node is activated, the main pull-up transistor Tpu1 outputs one of the gate shift clocks CLKs as the main scan pulse VGa of the turn-on level. A gate electrode of the main pull-up transistor Tpu1 is connected to the Q1 node, a source electrode of the main pull-up transistor Tpu1 is connected to an input terminal of the gate shift clocks CLKs, and a drain electrode of the main pull-up transistor Tpu1 is connected to a main output node No1. When the QB1 node is activated, the main pull-down transistor Tpd1 outputs a low potential voltage VSS as the main scan pulse VGa of the turn-off level. A gate electrode of the main pull-down transistor Tpd1 is connected to the QB1 node, a source electrode of the main pull-down transistor Tpd1 is connected to an input terminal of the low potential voltage VSS, and a drain electrode of the main pull-down transistor Tpd1 is connected to the main output node No1.

The auxiliary GIP circuit GIPb includes an auxiliary logic unit 141B and an auxiliary output unit 142B having an auxiliary pull-up transistor Tpu2 and an auxiliary pull-down transistor Tpd2. The auxiliary logic unit 141B controls charge and discharge operations of each of a Q2 node and a QB2 node in response to the second gate start signal VST2. The auxiliary pull-up transistor Tpu2 of the auxiliary output unit 142B outputs the auxiliary scan pulse VGb of the turn-on level when the Q2 node is charged to the voltage of an activation level. The auxiliary pull-down transistor Tpd2 of the auxiliary output unit 142B outputs the auxiliary scan pulse VGa of a turn-off level when the QB2 node is charged to the voltage of the activation level.

The Q2 node and the QB2 node are reversely charged and discharged. For example, when the Q2 node is charged to the voltage of the activation level, the QB2 node is discharged to the voltage of a non-activation level. On the contrary, when the Q2 node is discharged to the voltage of the non-activation level, the QB2 node is charged to the voltage of the activation level. When the Q2 node is activated, the auxiliary pull-up transistor Tpu2 outputs one of the gate shift clocks CLKs as the auxiliary scan pulse VGb of the turn-on level. A gate electrode of the auxiliary pull-up transistor Tpu2 is connected to the Q2 node, a source electrode of the auxiliary pull-up transistor Tpu2 is connected to the input terminal of the gate shift clocks CLKs, and a drain electrode of the auxiliary pull-up transistor Tpu2 is connected to an auxiliary output node No2. When the QB2 node is activated, the auxiliary pull-down transistor Tpd2 outputs the low potential voltage VSS as the auxiliary scan pulse VGb of the turn-off level. A gate electrode of the auxiliary pull-down transistor Tpd2 is connected to the QB2 node, a source electrode of the auxiliary pull-down transistor Tpd2 is connected to the input terminal of the low potential voltage VSS, and a drain electrode of auxiliary pull-down transistor Tpd2 is connected to the auxiliary output node No2.

FIGS. 11 to 12B illustrate a method for driving the pair of GIP circuits of FIG. 10 so as to obtain the display images shown in FIGS. 8A and 8B.

In the 2D mode, the main GIP circuit GIPa and the auxiliary GIP circuit GIPb are driven through a method indicated by the left of FIG. 11, so as to obtain the display image shown in FIG. 8A. As shown in FIG. 11, the main GIP circuit GIPa charges the Q1 node to the voltage of an activation level Lon, and at the same time discharges the QB1 node to the voltage of a non-activation level Loff in response to the first gate start signal VST1 of a turn-on level Lon. Hence, as shown in FIG. 12A, the main scan pulse VGa of the turn-on level Lon is generated. Further, the auxiliary GIP circuit GIPb discharges the Q2 node to the voltage of the non-activation level Loff in response to the second gate start signal VST2 of a turn-off level Loff and then continuously holds the Q2 node at the voltage of the non-activation level Loff. At the same time, the auxiliary GIP circuit GIPb charges the QB2 node to the voltage of the activation level Lon and then continuously holds the QB2 node at the voltage of the activation level Lon in response to the second gate start signal VST2 of the turn-off level Loff. Hence, as shown in FIG. 12A, the auxiliary scan pulse VGb is held at the turn-off level Loff. FIG. 12A illustrates the main scan pulse VGa and the auxiliary scan pulse VGb generated through the two pairs of GIP circuits in the 2D mode.

In the 3D mode, the main GIP circuit GIPa and the auxiliary GIP circuit GIPb are driven through a method indicated by the right of FIG. 11, so as to obtain the display image shown in FIG. 8B. As shown in FIG. 11, the main GIP circuit GIPa charges the Q1 node to the voltage of the activation level Lon, and at the same time discharges the QB1 node to the voltage of the non-activation level Loff in response to the first gate start signal VST1 of the turn-on level Lon. Hence, as shown in FIG. 12B, the main scan pulse VGa of the turn-on level Lon is generated. Further, the auxiliary GIP circuit GIPb charges the Q2 node to the voltage of the activation level Lon, and at the same time discharges the QB2 node to the voltage of the non-activation level Loff in response to the second gate start signal VST2, which is input at the turn-on level Lon later than the first gate start signal VST1 by a predetermined time period Td. Hence, as shown in FIG. 12B, the auxiliary scan pulse VGb of the turn-on level Lon is generated later than the main scan pulse VGa by the predetermined time period Td. FIG. 12B illustrates the main scan pulse VGa and the auxiliary scan pulse VGb generated through the two pairs of GIP circuits in the 3D mode.

According to the driving method illustrated in FIGS. 11 to 12B, in the 2D mode, the Q2 node of the auxiliary GIP circuit GIPb is continuously held at the voltage of the non-activation level Loff, and the QB2 node of the auxiliary GIP circuit GIPb is continuously held at the voltage of the activation level Lon.

Figure 13:
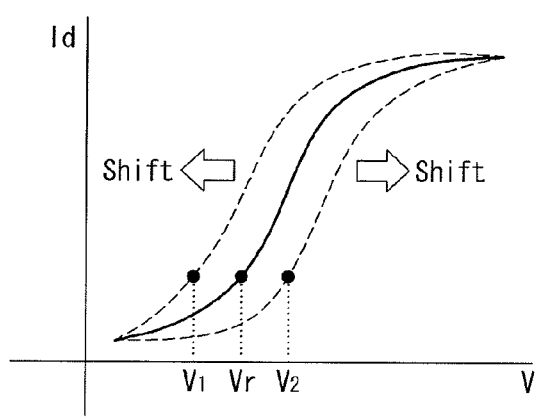
FIG. 13 illustrates the problems of a driving method illustrated in FIGS. 11 to 12B.

Hence, a negative gate bias stress is accumulated to the auxiliary pull-up transistor Tpu2 connected to the Q2 node, and a positive gate bias stress is accumulated to the auxiliary pull-down transistor Tpd2 connected to the QB2 node. As shown in FIG. 13, threshold voltages V1 and V2 of the output transistors Tpu2 and Tpd2 of the auxiliary GIP circuit GIPb are shifted to the left or right from a reference value Vr because of the positive and negative gate bias stresses. As a result, operation characteristics of the output transistors Tpu2 and Tpd2 are degraded in the 2D mode.

When the degradation of the output transistors Tpu2 and Tpd2 of the auxiliary GIP circuit GIPb is relatively greater than the degradation of the output transistors Tpu1 and Tpd1 of the main GIP circuit GIPa, a defective operation of the auxiliary GIP circuit GIPb in the 2D mode and an abnormal black image display of the auxiliary GIP circuit GIPb in the 3D mode may be caused.

FIGS. 14 to 15B illustrate another method for driving the pair of GIP circuits of FIG. 10 so as to obtain the display images shown in FIGS. 8A and 8B.

In the 2D mode, the main GIP circuit GIPa and the auxiliary GIP circuit GIPb are driven through a method indicated by the left of FIG. 14, so as to obtain the display image shown in FIG. 8A. As shown in FIG. 14, in the 2D mode, the second gate start signal VST2 is input at the turn-on level Lon earlier than the first gate start signal VST1 by the predetermined time period Td.

In the 2D mode, the auxiliary GIP circuit GIPb charges the Q2 node to the voltage of the activation level Lon, and at the same time discharges the QB2 node to the voltage of the non-activation level Loff in response to the second gate start signal VST2 of the turn-on level Lon. Hence, as shown in FIG. 15A, the auxiliary scan pulse VGb of the turn-on level Lon is generated. Further, the main GIP circuit GIPa charges the Q1 node to the voltage of the activation level Lon, and at the same time discharges the QB1 node to the voltage of the non-activation level Loff in response to the first gate start signal VST1, which is input at the turn-on level Lon later than the second gate start signal VST2 by the predetermined time period Td. Hence, as shown in FIG. 15A, the main scan pulse VGa of the turn-on level Lon is generated later than the auxiliary scan pulse VGb by the predetermined time period Td. As a result, as shown in FIG. 15A, the auxiliary subpixel SP2 is charged to the common voltage during the predetermined time period Td in response to the auxiliary scan pulse VGb, thereby displaying the black image. Then, the auxiliary subpixel SP2 and the main subpixel SP1 are charged to the same 2D data voltage in response to the main scan pulse VGa, thereby displaying the 2D image. FIG. 15A illustrates the main scan pulse VGa and the auxiliary scan pulse VGb generated through the two pairs of GIP circuits in the 2D mode.

In the 3D mode, the main GIP circuit GIPa and the auxiliary GIP circuit GIPb are driven through a method indicated by the right of FIG. 14, so as to obtain the display image shown in FIG. 8B. As shown in FIG. 14, in the 3D mode, the first gate start signal VST1 is input at the turn-on level Lon earlier than the second gate start signal VST2 by the predetermined time period Td.

In the 3D mode, the main GIP circuit GIPa charges the Q1 node to the voltage of the activation level Lon, and at the same time discharges the QB1 node to the voltage of the non-activation level Loff in response to the first gate start signal VST1 of the turn-on level Lon. Hence, as shown in FIG. 15B, the main scan pulse VGa of the turn-on level Lon is generated. Further, the auxiliary GIP circuit GIPb charges the Q2 node to the voltage of the activation level Lon, and at the same time discharges the QB2 node to the voltage of the non-activation level Loff in response to the second gate start signal VST2, which is input at the turn-on level Lon later than the first gate start signal VST1 by the predetermined time period Td. Hence, as shown in FIG. 15B, the auxiliary scan pulse VGb of the turn-on level Lon is generated later than the main scan pulse VGa by the predetermined time period Td. As a result, as shown in FIG. 15B, the auxiliary subpixel SP2 and the main subpixel SP1 are charged to the same 3D data voltage in response to the main scan pulse VGa, thereby displaying the 3D image. Then, the auxiliary subpixel SP2 is charged to the common voltage during the predetermined time period Td in response to the auxiliary scan pulse VGb, thereby displaying the black image. FIG. 15B illustrates the main scan pulse VGa and the auxiliary scan pulse VGb generated through the two pairs of GIP circuits in the 3D mode.

According to the driving method illustrated in FIGS. 14 to 15B, the output order of the main scan pulse VGa and the auxiliary scan pulse VGb varies depending on the driving mode. Namely, in the 3D mode, the auxiliary scan pulse VGb is generated later than the main scan pulse VGa by the predetermined time period Td. On the contrary, in the 2D mode, the auxiliary scan pulse VGb is generated earlier than the main scan pulse VGa by the predetermined time period Td. As a result, because the degradation of the output transistors Tpu2 and Tpd2 of the auxiliary GIP circuit GIPb is greatly reduced in the 2D mode, the defective operation of the auxiliary GIP circuit GIPb in the 2D mode and the abnormal black image display of the auxiliary GIP circuit GIPb in the 3D mode are solved. Further, the reliability characteristic of the gate driver is greatly improved.

As described above, the image display device and the method for driving the same according to the embodiment of the invention divide each subpixel into the main subpixel and the auxiliary subpixel, display the same 2D image on the main subpixel and the auxiliary subpixel in the 2D mode, and display the 3D image on the main subpixel and the black image on the auxiliary subpixel in the 3D mode, thereby increasing the vertical viewing angle of the 3D image without the reduction in the luminance of the 2D image.

Furthermore, the image display device and the method for driving the same according to the embodiment of the invention vary the output order of the main scan pulse for driving the main subpixel and the auxiliary scan pulse for driving the auxiliary subpixel depending on the driving mode. In the 2D mode, the auxiliary subpixel displays the black image in response to the auxiliary scan pulse and then displays the same 2D image along with the main subpixel by the main scan pulse, which is input later than the auxiliary scan pulse by the predetermined time period. In the 3D mode, the auxiliary subpixel displays the same 3D image along with the main subpixel in response to the main scan pulse and then displays the black image by the auxiliary scan pulse, which is input later than the main scan pulse by the predetermined time period. As a result, because the reliability characteristics of the gate driver in the 2D and 3D modes are balanced with each other, a difference between the degradation characteristics of the gate driver in the 2D and 3D modes is greatly reduced.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An image display device comprising:
    a display panel configured to selectively display a 2D image and a 3D image, the display panel including a subpixel disposed at a crossing between a pair of gate lines and a data line;
    a panel driver including a gate driver for driving the pair of gate lines and a data driver for driving the data line;
    a controller configured to differently control the panel driver in response to a mode selection signal; and
    a patterned retarder configured to divide light from the display panel into first polarized light and second polarized light,
    wherein in a 2D mode, an auxiliary display unit of the subpixel is charged to a common voltage in response to an auxiliary scan pulse supplied to an auxiliary gate line of the pair of gate lines, and then the auxiliary display unit and a main display unit of the subpixel are charged to a 2D data voltage for the 2D image by a main scan pulse supplied to a main gate line of the pair of gate lines, the main scan pulse being input later than the auxiliary scan pulse by a predetermined time period, and
    wherein in a 3D mode, the main display unit and the auxiliary display unit are charged to a 3D data voltage for the 3D image in response to the main scan pulse, and then the auxiliary display unit is charged to the common voltage by the auxiliary scan pulse, the auxiliary scan pulse being input later than the main scan pulse by the predetermined time period.

2. The image display device of claim 1, wherein the gate driver includes:
    a main gate-in-panel circuit configured to generate the main scan pulse in response to a first gate start signal and supply the main scan pulse to the main gate line; and
    an auxiliary gate-in-panel circuit configured to generate the auxiliary scan pulse in response to a second gate start signal and supply the auxiliary scan pulse to the auxiliary gate line.

3. The image display device of claim 2, wherein the first gate start signal is generated later than the second gate start signal by the predetermined time period in the 2D mode, and
    wherein the first gate start signal is generated earlier than the second gate start signal by the predetermined time period in the 3D mode.

4. The image display device of claim 3, wherein the subpixel includes:
    the main display unit including a first pixel electrode and a common electrode opposite to the first pixel electrode;
    the auxiliary display unit including a second pixel electrode and the common electrode opposite to the second pixel electrode;
    a first thin film transistor configured to switch on or off a current path between the first pixel electrode and the data line in response to the main scan pulse;
    a second thin film transistor configured to switch on or off a current path between the second pixel electrode and the data line in response to the main scan pulse; and
    a third thin film transistor configured to switch on or off a current path between the second pixel electrode and the common electrode of the auxiliary display unit in response to the auxiliary scan pulse.

5. The image display device of claim 4, wherein in the 2D mode, the auxiliary display unit displays a black image in response to the auxiliary scan pulse and then displays the same 2D image along with the main display unit by the main scan pulse, and wherein in the 3D mode, the auxiliary display unit displays the same 3D image along with the main display unit in response to the main scan pulse and then displays a black image by the auxiliary scan pulse.

6. A method for driving an image display device including a display panel, which includes a subpixel disposed at a crossing between a pair of gate lines and a data line to selectively display a 2D image and a 3D image, a panel driver for driving the pair of gate lines and the data line, and a patterned retarder for dividing light from the display panel into first polarized light and second polarized light, the method comprising:

receiving a mode selection signal;

deciding a 2D mode and a 3D mode in response to the mode selection signal;

charging an auxiliary display unit of the subpixel to a common voltage in response to an auxiliary scan pulse supplied to an auxiliary gate line of the pair of gate lines and then charging the auxiliary display unit and a main display unit of the subpixel to a 2D data voltage for the 2D image by a main scan pulse supplied to a main gate line of the pair of gate lines in the 2D mode, the main scan pulse being input later than the auxiliary scan pulse by a predetermined time period; and charging the main display unit and the auxiliary display unit to a 3D data voltage for the 3D image in response to the main scan pulse and then charging the auxiliary display unit to the common voltage by the auxiliary scan pulse in the 3D mode, the auxiliary scan pulse being input later than the main scan pulse by the predetermined time period.

7. The method of claim 6, wherein a first gate start signal for generating the main scan pulse is generated later than a second gate start signal for generating the auxiliary scan pulse by the predetermined time period in the 2D mode, and wherein the first gate start signal is generated earlier than the second gate start signal by the predetermined time period in the 3D mode.

8. The method of claim 7, wherein in the 2D mode, the auxiliary display unit displays a black image in response to the auxiliary scan pulse and then displays the same 2D image along with the main display unit by the main scan pulse, and wherein in the 3D mode, the auxiliary display unit displays the same 3D image along with the main display unit in response to the main scan pulse and then displays a black image by the auxiliary scan pulse.

* * * * *